April 22, 1952     J. R. RIEWERTS     2,593,796

LOAD SUPPORTING ATTACHMENT FOR TRACTORS

Filed Feb. 11, 1947

INVENTOR.
J. R. Riewerts
BY
Merrill M. Blackburn
Att'y.

Patented Apr. 22, 1952

2,593,796

UNITED STATES PATENT OFFICE 2,593,796

LOAD-SUPPORTING ATTACHMENT FOR TRACTORS

John Raymond Riewerts, Davenport, Iowa

Application February 11, 1947, Serial No. 727,786

3 Claims. (Cl. 214—131)

The present invention relates to agricultural machinery and more particularly to a load-bearing attachment for a tractor of a well known type. The main purpose of this invention is the provision of a simple, inexpensive apparatus which can be quickly attached to and detached from a tractor and which will serve efficiently in transporting small loads from place to place, particularly about a farm. For example, a tractor equipped with an attachment as disclosed herein can be used in transporting a load of milk from a farmyard out to a highway to be picked up by a milk-collecting truck. It may be used to move bales of hay from place to place upon a farm or ranch. It may be used in moving small farm buildings from one place to another, and it may be used in moving various farm animals from place to place. This provides a farmer, having a tractor, with the equivalent of a light truck, which is even more desirable than a light truck because it enables one man to do jobs requiring the time and labor of two or more men when the work is done by means of a truck.

In the drawings annexed hereto and forming a part hereof,

Figure 1:
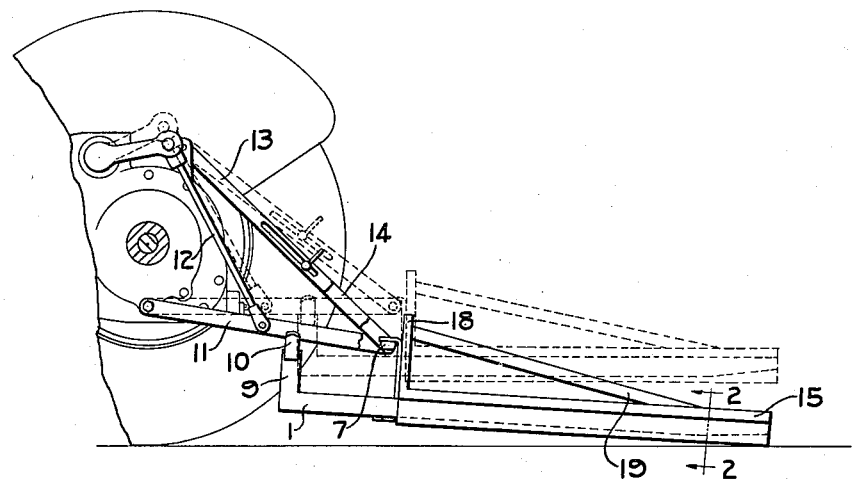
Fig. 1 shows a side elevation of an apparatus constructed in accordance with my invention, attached to the rear end of a tractor.

Reference will now be made in greater detail to the annexed drawings for a more detailed description of this invention. A pair of load-supporting beams 1 and 2 are connected at their forward ends by cross-ties 3 and 4, and these parts are referred to herein as an assembly. Rising from one of the cross-ties are hangers 5 which have their upper ends bent forwardly to form hooks 6 which hook over the hitch-bar 7 of the tractor, the rear end portion of which is shown in Fig. 1, with one wheel removed for the sake of clarity of disclosure. A pin 8 extends downwardly from each hook 6. These pins 8 are to be located in holes through the hitch bar 7 and serve to hold the assembly attached to the tractor. Preferably the lower ends of the hangers 5 are bent at a right angle and extend under the cross-tie 3, to the under side of which they are welded, thus materially increasing the strength of the structure. From the forward end of the assembly rise abutments 9 provided with extensions 10. The tractor is provided with a pair of elevating arms 11 which are pivotally attached at one end to the tractor, the second ends of the arms extending rearwardly from the tractor. Links 12 connect the mid-portions of the arms 11 to the power means of the tractor by which the links 12 and arms 11 are elevated. A pair of link sections 13 and 14 are slidably connected and slide with relation to each other when the assembly is raised or lowered. The parts 11, 12, 13, and 14 are parts of the tractor as manufactured and, therefore, they constitute no part of this invention except in so far as they constitute part of the power means for elevating the support of this invention.

Figure 2:
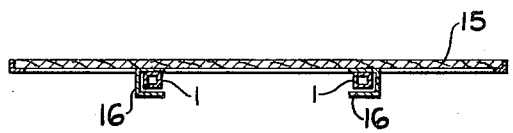
Fig. 2 represents a transverse section through the structure of Fig. 1, near the right hand end thereof.
Figure 3:
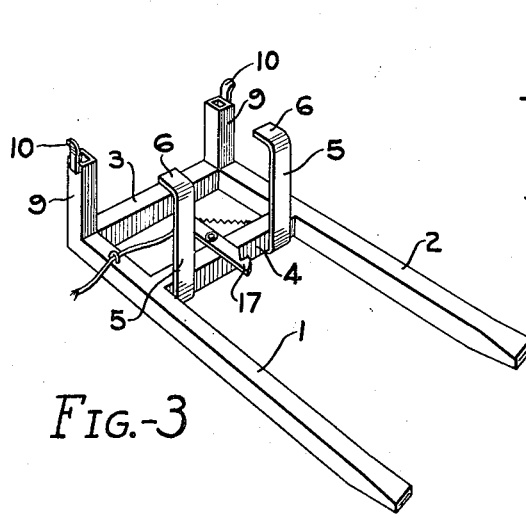
Fig. 3 is a perspective view of an apparatus embodying this invention.
Figure 4:
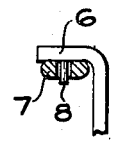
Fig. 4 is a fragmentary section showing the attachment of one of the hanger members to a tractor hitch-bar.

For most purposes a platform 15 having channels 16 on its under side is placed on the beams 1 and 2 and is latched in place by a securing means 17, shown in Fig. 3 as a spring-actuated latching hook. The channels face in opposite directions and are shown in Fig. 2 as facing each other. The platform 15 is provided at its forward end with an upstanding framework 18 which is braced with relation to the platform by a pair of braces 19, one at each side of the platform.

When mounting the platform on the assembly, the arms 1 and 2 are lined up with the openings in the channels 16 and the tractor is backed up to cause the arms to slide into place under the platform. If it is desired to convert the platform into a box, sides and endgates are added thereto and these may, within certain limits, be built as high as desired. When the load has been placed on the platform or in the box, the tractor hydraulic is operated to cause the elevating mechanism to lift the platform and its load, the elevating platform and elevating mechanism assuming the position indicated by the broken lines in Fig. 1, or higher, if desired.

The attachment is prevented from lateral oscillation by the upward projections 10 which engage the sides of the arms 11. The rear ends of the beams or bars 1 and 2 are beveled on the under side to slide more easily into the channels 16, which may be of other forms, such as square or circular tubes. If a load which is too great for the hydraulic to lift is to be loaded and transported, the platform can be raised to transporting position and the links 13 and 14 clamped together by tightening up the nuts on the bolts extending therethrough, after which the load may be put on the platform.

Attention is directed to the fact that this structure is self-securing and requires no separate bolts or pins to secure it in place. It is merely attached and it is then ready for use. This structure is so built that it may be put in place without removing a belt pulley mounted on the tractor power take-off shaft. There is no interference between the pulley and the attachment.

It is of course understood that the specific description of structure set forth above may be departed from without departing from the spirit of this invention as disclosed in this specification and as defined in the appended claims.

Having now described my invention, I claim:

1. An attachment for a tractor having elevating arms, hitch means connecting the rear ends of the arms, and power operated means for lifting said arms; the combination of load-supporting beams, cross-ties connecting the beams at one end, the beams and cross-ties constituting an assembly, hanger arms connected to the assembly to suspend it from the hitch means, said hanger arms having substantially horizontally extending arms to hook over the top of the hitch means, the assembly having upward extensions at its forward end for engagement with the tractor elevating arms to help in positioning the assembly when the elevating arms are raised, and a load-receiving platform supported by the load-supporting arms, said platform having an upwardly extending framework at its forward end and braces extending rearwardly from the upper portion of the framework and connected to the lateral edges of the platform.

2. An attachment for a tractor having elevating arms, hitch means connecting the rear ends of the arms, and power elevating means for lifting said arms; the combination of an assembly comprising load-supporting arms and cross-tie members connecting them, a platform mouned on said arms, hangers connected to the assembly and rising therefrom in a position to engage the hitch means and lift the load-supporting arms when the elevating arms are raised, and latch means for securing said platform to the assembly, the assembly having upwardly extending abutments at its forward end for engagement with the elevating arms during a load-lifting operation.

3. An attachment for a tractor having elevating arms, hitch means connecting the rear ends of the arms, and power elevating means for lifting said arms; the combination of an assembly comprising load-supporting arms and cross-tie members connecting them, hangers connected to the assembly and rising therefrom in a position to engage the hitch means and lift the load-supporting arms when the elevating arms are raised, the assembly having upwardly extending abutments at its forward end for engagement with the elevating arms during a load-lifting operation, and a load-receiving platform supported by the load-supporting arms.

JOHN RAYMOND RIEWERTS.

REFERENCES CITED

The following references are of record in the file of this patent:

UNITED STATES PATENTS

| Number | Name | Date |
| --- | --- | --- |
| 2,254,292 | Jones | Sept. 2, 1941 |
| 2,319,456 | Hazen | May 18, 1943 |
| 2,362,991 | Dahl | Nov. 21, 1944 |
| 2,364,493 | Ulinski | Dec. 5, 1944 |
| 2,387,744 | Clapp | Oct. 30, 1945 |
| 2,427,575 | Sedore | Sept. 16, 1947 |

FOREIGN PATENTS

| Number | Country | Date |
| --- | --- | --- |
| 88,305 | Switzerland | Feb. 16, 1921 |